UNITED STATES PATENT OFFICE.

CARLETON ELLIS, OF LARCHMONT, NEW YORK, ASSIGNOR TO ELLIS-FOSTER COMPANY, A CORPORATION OF NEW JERSEY.

SCALE-DESTROYING COMPOSITION.

No. 896,094.    Specification of Letters Patent.    Patented Aug. 18, 1908.

Application filed January 14, 1908. Serial No. 410,834.

*To all whom it may concern:*

Be it known that I, CARLETON ELLIS, a citizen of the United States, residing at Larchmont, in the county of Westchester and State of New York, have invented certain new and useful Improvements in Scale-Destroying Composition, of which the following is a specification.

This invention relates to compositions for destroying San Jose scale and similar scale, fungi and the like, and comprises the waste liquors from the manufacture of wood pulp by the sulfite process, in conjunction with kerosene, or similar oily material.

Waste cellulose sulfite liquor may be concentrated to a gravity of about 30° Baumé, in which condition, apparently because the sulfonated products which are present in the compound, it exhibits peculiar emulsifying and solvent properties for certain oils, and in particular ordinary kerosene oil. When properly mixed with kerosene oil, almost clear solutions are produced, in spite of the large percentage of water present, which should emulsify or separate from the oil and produce solutions of a cloudy or turbid appearance. Under the conditions of preparation as hereinafter set forth in an illustrative way, turbid products need not be produced, but instead clear solutions, or solutions which are substantially clear, barring perhaps the existence of a slight scum upon the surface, may be prepared which have unusual virtues with respect to the destruction of scale in orchards, and for other kindred purposes.

A suitable composition illustrative of my invention is made by heating the waste sulfite liquor, concentrated to a gravity of about 30° Baumé, to a temperature of 80° C., or over, and in emulsifying or incorporating therewith kerosene oil having a flash point from 100° to 150° Fhr. Ordinarily two parts of kerosene may be combined with one part of the concentrated waste sulfite liquor. The two components are beaten together in a suitable emulsifier; the sulfite liquor being first placed in the mixing apparatus and the kerosene gradually added thereto. It is desirable to add the kerosene slowly in order to start the combination with the sulfite liquor to the desired extent in order that clear or substantially clear products may be obtained. It is difficult to say just what is the action of the concentrated sulfite liquor upon the kerosene oil. The sulfite liquor contains sulfonated products, probably a sulfonic compound of lignin in combination with lime, and these may have some obscure action upon the kerosene oil, whereby it is brought into a state of solution, or seeming solution.

While I prefer to use the waste sulfite liquor of about the concentration above specified, I may, of course, use lesser strengths, in which case it is generally desirable to reduce the proportion of kerosene employed. Various other petroleum products of a heavier consistency, or even certain of the crude products may be used. Tarry matter is as a rule disadvantageous.

In using my composition, it is generally diluted with from ten to twenty times its volume of water, and applied to the trees, etc., by means of a suitable spraying device. Ten parts of water to one part of the composition is the proportion which I prefer to use, except on very sensitive shrubs or trees.

Owing to the very fine state of division in which the kerosene exists in combination with the sulfite liquor, and which, as stated, may be a sort of solution, it is found that on dilution with the times or more of its volume of water, that a true emulsion is produced with the particles of kerosene oil in the state of the finest possible subdivision, so that very permanent and satisfactory spraying mixtures are made; permitting of a thorough application of the composition without trouble from clogging of the spraying apparatus.

Inasmuch as the waste liquor may be readily neutralized by the addition of lime or other alkali during the operation of concentration, it is possible to make an entirely neutral oil and sulfur scale destroying composition; a composition, which to my knowledge, has heretofore not been employed by orchardists.

It is evident in the use of whale oil soap and other kinds of soap to effect emulsification with kerosene oil that an alkaline reaction is given to the composition through the presence of free alkali in the soap, or by the hydrolysis of the soap because of its dilution with water.

The use of compositions having an alkaline reaction has drawbacks because of occasional evil effects upon trees. This is especially noticeable if the composition is washed into the ground so as to come in contact with the roots of the trees. My composition, therefore, which may be made of an entirely neutral character, is particularly adapted for use on trees of a sensitive character. It further has the great advantage of employing a high efficient sulfur-carrying adhesive and scalecidal body, the sulfite liquor; in conjunction with the kerosene oil so combined that each constituent supplements and augments the action of the other.

The proportions which have been given in the above formula may be varied more or less to meet different conditions. Other bodies than those mentioned may also be introduced into my composition, such as flowers of sulfur, calcium sulfid, sodium cresylate and similar material having an inhibiting action on scale growth.

What I claim is:—

1. A composition of matter for the destruction of scale, which comprises kerosene oil and concentrated waste cellulose sulfite liquor.

2. A composition of matter for destroying scale, which comprises an emulsion of waste sulfite liquor of about 30° Baumé with kerosene oil.

3. A composition of matter for destroying scale, comprising an emulsion of kerosene oil and waste cellulose sulfite liquor in a concentrated condition; the proportion of the kerosene oil being in excess of the waste cellulose sulfite liquor.

4. A scale destroying compound consisting substantially of kerosene and waste cellulose sulfite liquor.

5. A scale destroying composition comprising a petroleum oil, and substantially neutral waste cellulose sulfite liquor in a concentrated condition.

6. A scale destroying composition consisting of approximately two parts of kerosene oil and approximately one part of neutral waste cellulose sulfite liquor of a gravity of approximately 30° Baumé.

In testimony whereof I have affixed my signature in presence of two witnesses.

CARLETON ELLIS.

Witnesses:
NATHANIEL L. FOSTER,
HENRIETTA BERKWITZ.